(12) United States Patent
Berthe

(10) Patent No.: US 7,173,545 B2
(45) Date of Patent: Feb. 6, 2007

(54) AIRCRAFT NAVIGATION AID METHOD AND DEVICE

(75) Inventor: Benoît Berthe, Toulouse (FR)

(73) Assignee: Thales, Neuilly sur Seine (FR)

( * ) Notice: Subject to any disclaimer, the term of this patent is extended or adjusted under 35 U.S.C. 154(b) by 148 days.

(21) Appl. No.: 10/519,806

(22) PCT Filed: Jul. 4, 2003

(86) PCT No.: PCT/FR03/02082

§ 371 (c)(1),
(2), (4) Date: Dec. 29, 2004

(87) PCT Pub. No.: WO2004/010079

PCT Pub. Date: Jan. 29, 2004

(65) Prior Publication Data

US 2005/0248470 A1    Nov. 10, 2005

(30) Foreign Application Priority Data

Jul. 19, 2002    (FR) ................................. 02 09208

(51) Int. Cl.
*G08G 5/04* (2006.01)
(52) U.S. Cl. ...................... 340/961; 340/945; 340/971; 701/9; 701/14; 701/301
(58) Field of Classification Search ................. 340/961
See application file for complete search history.

(56) References Cited

U.S. PATENT DOCUMENTS

| 3,052,882 | A | * | 9/1962 | Pidhayny et al. | 340/961 |
| 4,224,669 | A | * | 9/1980 | Brame | 340/970 |
| 4,862,373 | A | * | 8/1989 | Meng | 701/301 |
| 5,111,400 | A | * | 5/1992 | Yoder | 701/14 |
| 6,480,120 | B1 | * | 11/2002 | Meunier | 340/961 |
| 6,546,338 | B2 | * | 4/2003 | Sainthuile et al. | 701/301 |
| 7,053,797 | B2 | * | 5/2006 | Taylor | 340/961 |

FOREIGN PATENT DOCUMENTS

| EP | 0 802 469 A | 10/1997 |
| FR | 2 813 963 A | 3/2002 |

* cited by examiner

*Primary Examiner*—Daniel Wu
*Assistant Examiner*—Eric M. Blount
(74) *Attorney, Agent, or Firm*—Lowe Hauptman & Berner, LLP

(57) ABSTRACT

The invention relates to an aircraft navigation aid method. It comprises the following steps of defining an area to be sensed to the right and to the left of a first hypothetical path of the aircraft, sensing, for each of the two areas to be sensed to the right and to the left, a corresponding predefined underlying relief, in order to identify dangerous sub-zones to the right and/or to the left, computing, for each of the dangerous sub-zones to the right and/or to the left, a time $\Delta T$ remaining to begin an avoidance maneuver before a point of no return, and determining for the dangerous sub-zones to the right a minimum $\Delta T$ denoted $\Delta T$ right and/or for the dangerous sub-zones to the left a minimum $\Delta T$ denoted $\Delta T$ left, establishing a navigation aid from $\Delta T$ right and/or $\Delta T$ left.

20 Claims, 5 Drawing Sheets

AIRCRAFT NAVIGATION AID METHOD AND DEVICE

CROSS-REFERENCE TO RELATED APPLICATIONS

The present Application is based on International Application No. PCT/FR2003/002082, filed on Jul. 4, 2003, which in turn corresponds to FR 02/09208 filed on Jul. 19, 2002, and priority is hereby claimed under 35 USC §119 based on these applications. Each of these applications are hereby incorporated by reference in their entirety into the present application.

FIELD OF THE INVENTION

The invention relates to an aircraft navigation aid method.

The field of the invention is that of air navigation and safety aid and relates more particularly to ground avoidance maneuvers.

DESCRIPTION OF THE PRIOR ART

Onboard devices for performing vertical avoidance maneuvers are already known.

Such a device described in patent EP 0 565 399 comprises in particular a mass memory for storing topographical data representing a substantial portion of the surface of the earth, a fast-access working memory into which is transferred the topographical data corresponding to the flight area of the aircraft and means of predicting the path of the aircraft, based on status indications relating to the longitude, latitude, altitude, speed and acceleration of the aircraft. The planned path is compared to the topographical data in the fast-access memory; in the event of a potential collision with the ground, an alarm is triggered and a vertical avoidance maneuver is suggested to the pilot.

In some cases, particularly on approaches or take-offs in mountainous areas, the aircraft nears the ground without that fact constituting a threat or an abnormality. The collision-avoidance device is then set to a specific mode designed to reduce the rate of false alarms; however, when a threat is detected, the vertical avoidance maneuver is often no longer possible.

Another device described in patent EP 0 802 469, refining the above device, further suggests to the pilot a lateral avoidance maneuver when the vertical avoidance maneuver is no longer possible. A first and then a second alarm are triggered when the aircraft crosses respective thresholds of 20 then 5 seconds before the point of no return, in other words before the ultimate point from which an avoidance maneuver must absolutely have been started.

These predefined thresholds are not always suited to the area in which the aircraft is flying, and this device does not provide for continuous monitoring of how the danger changes; it does not truly quantify the danger, in other words continually determine the time remaining to undertake a lateral avoidance maneuver to the right or to the left before the point of no return.

SUMMARY OF THE INVENTION

An important object of the invention is therefore to determine continually the time remaining to undertake an avoidance maneuver before the point of no return.

To achieve these aims, the invention proposes an aircraft navigation aid method, mainly characterized in that it comprises the following steps consisting in:
a) defining an area to be sensed to the right and to the left of a first hypothetical path of the aircraft, designated the feeler line support path,
b) sensing, for each of the two areas to be sensed to the right and to the left, a corresponding predefined underlying relief, in order to identify dangerous sub-zones to the right and/or to the left,
c) computing, for each of the dangerous sub-zones to the right and/or to the left, a time $\Delta T$ remaining to begin an avoidance maneuver before a point of no return, and determining for the dangerous sub-zones to the right a minimum $\Delta T$ denoted $\Delta T$ right and/or for the dangerous sub-zones to the left a minimum $\Delta T$ denoted $\Delta T$ left,
d) establishing a navigation aid from $\Delta T$ right and/or $\Delta T$ left.

The method according to the invention thus comprises a number of steps mainly consisting in sensing along a feeler line support path of the aircraft and to each side of the latter, the relief underlying an area marked out by grids, for example, identifying the grids presenting a potential danger and, for these grids, the time remaining before undertaking an avoidance maneuver.

According to a feature of the invention, the feeler line support path is determined during a time T broken down into a pilot reaction time $T_{reac}$, a time $T_{pull}$ for placing the aircraft on a horizontal path and the time $T_{roll}$ for placing the aircraft in a roll.

According to another feature of the invention, the dangerous sub-zones of step b) are identified according to a second hypothetical path of the aircraft such that:
if the aircraft is ascending, the ascent is stopped immediately,
in other cases, the path is continued unchanged.

The purpose of this second hypothetical path is to increase the safety margin of the method.

The time $\Delta T$ of step c) is advantageously computed according to a hypothetical flight time toward a dangerous sub-zone, calculated according to a time $T_{pull}$ to place the aircraft on a horizontal path and a time $T_{roll}$ to place the aircraft in a roll:
in a horizontal plane when the aircraft is ascending or is flying level,
in a horizontal plane and in a vertical plane when the aircraft is descending.

According to another feature of the invention, step d) comprises a step for comparing $\Delta T$ right and/or $\Delta T$ left with one or more predefined times and, where appropriate, a step consisting in determining the time remaining for the safest side (best lateral) from the maximum between $\Delta T$ right and/or $\Delta T$ left and the time remaining for the least safe side (worst lateral) from the minimum between $\Delta T$ right and/or $\Delta T$ left.

Another object of the invention is to produce an aircraft navigation aid device, comprising a mass memory designed to store a terrain database, a program memory comprising an application program of the method as described, a central processing unit designed to run the program and an input/output interface.

BRIEF DESCRIPTION OF THE DRAWINGS

Other features and advantages of the invention will become apparent on reading the detailed description that follows, given by way of non-limiting example and with reference to the appended drawings in which.

DETAILED DESCRIPTION OF THE INVENTION

The invention relates to an aircraft navigation aid; in the description that follows, an airplane will be taken as a typical aircraft. It will also be assumed that the navigation aid relates to the pilot; it may more generally relate to a piloting system in particular in the case of an automatic pilot.

The method according to the invention comprises a number of steps mainly consisting in sensing, along a hypothetical path of the aircraft and to each side of the latter, the relief underlying a strip of terrain identified by grids, identifying the grids presenting a potential danger and, for these grids, the time remaining before undertaking an avoidance maneuver.

The first step consists in defining an area to be sensed to the right and to the left of a hypothetical path of the airplane which is designated in the description below as a feeler line support path and which is determined for a time T as will be seen later.

The term feeler line or area to be sensed is the shape defined by a succession of rings along this feeler line support path.

Figure 1:
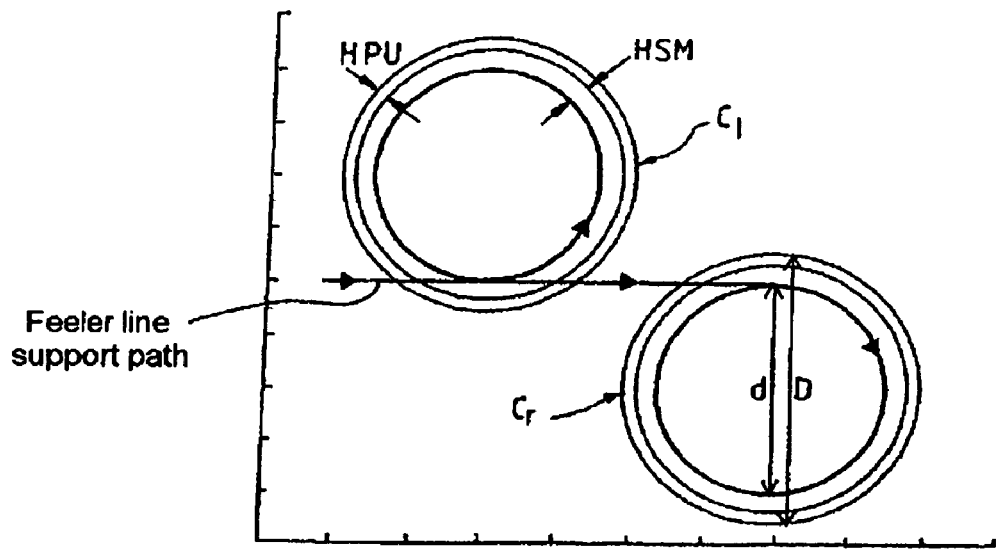
FIG. 1 diagrammatically represents right and left rings Cr and Cl respectively in an unbalanced case, FIGS. 2a, 2b diagrammatically represent, in a horizontal plane, examples of areas to be sensed in the case of an initial straight line (2a) and turning (2b) path and FIG. 2c diagrammatically represents, in a vertical plane, an example of path supporting these areas to be sensed, FIG. 3 diagrammatically represents the grid of the relief underlying a ring Cr, FIGS. 4a and 4b respectively and diagrammatically represent, in a vertical then horizontal plane, path sections during defined times, and FIG. 4c diagrammatically illustrates, in a horizontal plane, the time remaining for the best lateral and the worst lateral, FIG. 5 diagrammatically represents an example of presentation of navigation aid information, FIG. 6 diagrammatically represents an example of a device for implementing the navigation aid method as described.

Two rings, respectively right Cr and left Cl, are represented in FIG. 1. The diameter D of each ring is of the form:

$$D=d+HSM+HPU$$

d being the diameter of the avoidance maneuver circle, HSM being a horizontal safety margin, HPU being a horizontal position uncertainty.

For an Airbus 340, for example, HSM=220 m and HPU=100 m.

As can be seen in FIG. 1, the right and left rings Cr and Cl respectively overlap the feeler line support path; they also overlap each other when they are not offset as shown in this FIG. 1. Only the right and left avoidance circles are tangential to the path and tangential to each other when the rings are not offset.

From the current position of the aircraft, the right rings succeed each other continuously, remaining tangential to the feeler line support path; the same applies for the left rings Cl. FIG. 2a shows three left rings Cl succeeding each other at times t, t' and t''. These successions of rings occurring between the time t0 corresponding to the current position of the airplane and a time T defined later thus define an area to be sensed to the right and to the left represented in a horizontal plane in FIGS. 2a and 2b according to whether the initial path of the airplane is straight or turning. These areas to be sensed are in the form of strips.

Figure 2C:
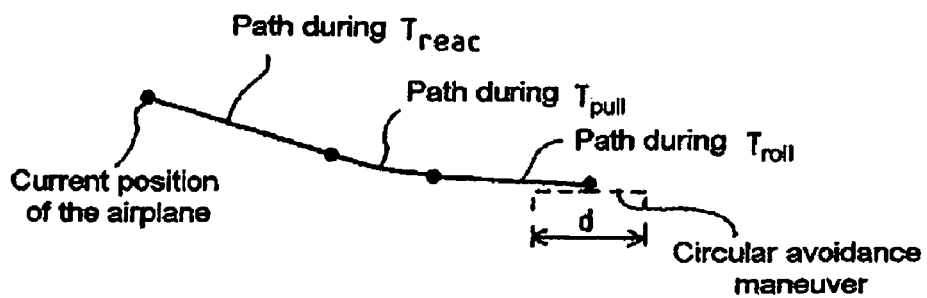
Figure 2A:
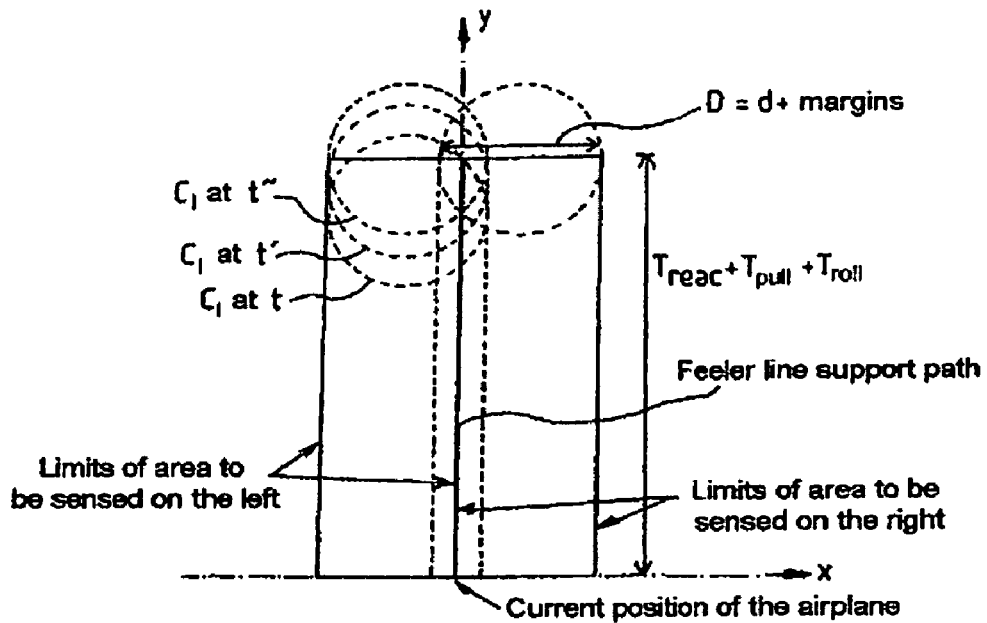

The feeler line support path of the airplane is determined during a time $T=T_{reac}+T_{pull}+T_{roll}$, the path sections respectively corresponding to these times $T_{reac}$, $T_{pull}$ and $T_{roll}$ as represented in a vertical plane in FIG. 2c. The terms are defined as follows:

$T_{reac}$ is the reaction time of the pilot (or of the piloting unit) before starting the avoidance maneuver, in other words the time during which the airplane continues on its path without changing parameters (speed unchanged as an absolute value, turn radius unchanged if the airplane is turning, gradient unchanged if the airplane is descending). This time $T_{reac}$ is defined by default; as an example $T_{reac}=25$ sec could apply when the aircraft is descending and $T_{reac}=0$ sec could apply when the airplane is ascending, $T_{pull}$ is the time needed for the airplane to perform a pull-out in the vertical plane, in other words to return to a horizontal path when the airplane is initially descending or ascending; when the situation demands a lateral avoidance maneuver, the pilot will first of all make himself safe with respect to the relief in the vertical plane by stopping the vertical change as early as possible; conventionally, $T_{pull}=|\gamma_0| \times V/fcv$, $\gamma_0$ being the gradient of the airplane, V its current speed and fcv its vertical loading factor.

$T_{roll}$ is the time to place the airplane in a roll in order to perform an avoidance turn (or circle); placing in a roll consists in changing the roll from its initial value to a final value equal, for example, to ±33° (the sign depending on the direction of turn toward the right or toward the left) taking into account a roll rate equal, for example, to 7°/sec for an A340 type airplane. $T_{roll}$ can be equal to 0 when the placing in a roll coincides with the current turn of the airplane. Although placing in a roll is translated by a placing in a turn, it is artificially assumed that the feeler line support path during this time $T_{roll}$ is the same as the current path and is therefore straight if the current path of the airplane was straight; this represents an additional safety margin.

As is represented in the horizontal plane in FIG. 2a, when the current path of the airplane is straight, in other words presenting a roll angle less than 1° for example, the time $T_{reac}+T_{pull}+T_{roll}$ for each of the rings is the same to the right and to the left of the feeler line support path and the areas to be sensed to the right and to the left are the same.

Figure 2B:
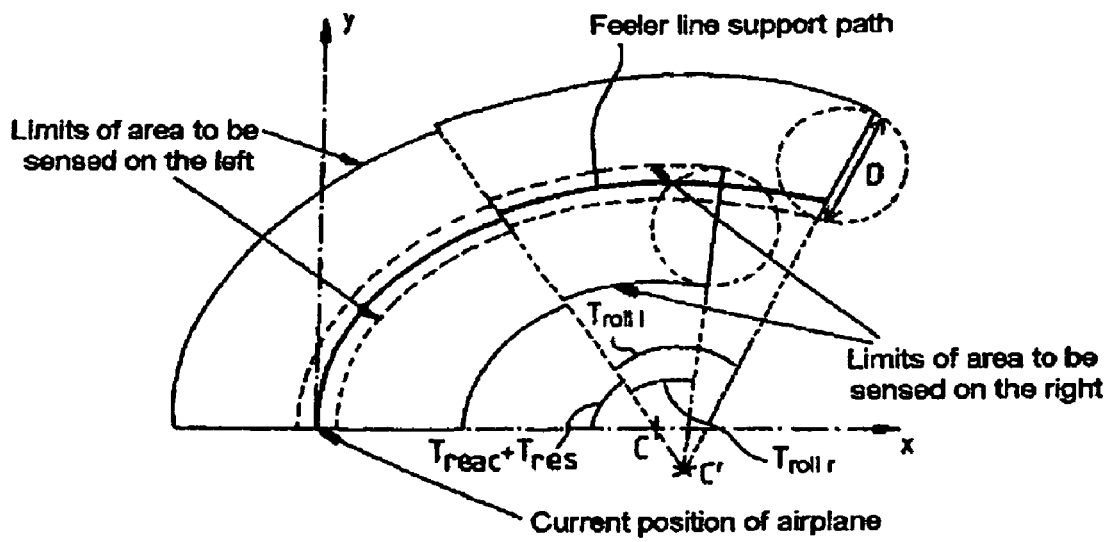

When the current path of the airplane is a turn, as is represented in the horizontal plane in FIG. 2b in the case of a current turn to the right, the areas to be sensed to the right and to the left differ not only for obvious reasons of geometry but also because the time $T_{reac}+T_{pull}+T_{roll}$ differs between a ring to the right and a ring to the left. In practice, the times $T_{reac}$ and $T_{pull}$ are the same; however, when the placing in a roll consists in continuing or accentuating the roll of the current turn, the time to place in a roll is less than the contrary case for which it is first of all necessary to reestablish a straight line path before placing in the required roll opposite to the roll of the current turn. There is then a distinction between a time to place in a roll to the right $T_{rollr}$ and a time to place in a roll to the left $T_{rolll}$. In the case of a current turn to the right as represented in FIG. 2b, $T_{rollr}<T_{rolll}$.

Furthermore, it is preferably planned that the speed $V_{turn}$ at which the maneuver is performed during $T_{rolll}$ or $T_{rollr}$ is equal to the speed of the airplane in its current position uprated by x % (x %=10%, for example). This speed variation occurs during $T_{reac}+T_{pull}$. The feeler line support path then comprises two parts: the point C is the center of the circle representing the feeler line support path during $T_{reac} + T_{pull}$ and C' is the center of the circle representing the feeler line support path during $T_{rollr}$ or $T_{rolll}$, the turn being performed at the speed $V_{turn}$. Although the path during $T_{reac}+T_{pull}$ is not exactly a circle, since the speed varies, it is sufficiently close to a circle for this approximation to be made.

Overall, the feeler line support path is, in the horizontal plane, the continuation of the current straight line or turn (to within this approximation), during $T_{reac}+T_{pull}+T_{roll}$. In the vertical plane, the vertical change is stopped to return to a horizontal path, during $T_{reac}+T_{pull}$ when the airplane is descending and during $T_{pull}$ when the airplane is ascending (which corresponds to the worst case ascending).

The airplane moreover has a terrain database comprising topographical data representative of the relief of the earth and in particular of that over which the airplane is or will be flying. This digitized topographical data is conventionally identified according to a grid reference.

In a second step, this topographical data is used to determine the potential dangers of the relief underlying the areas to be sensed to the right and to the left.

Figure 3:
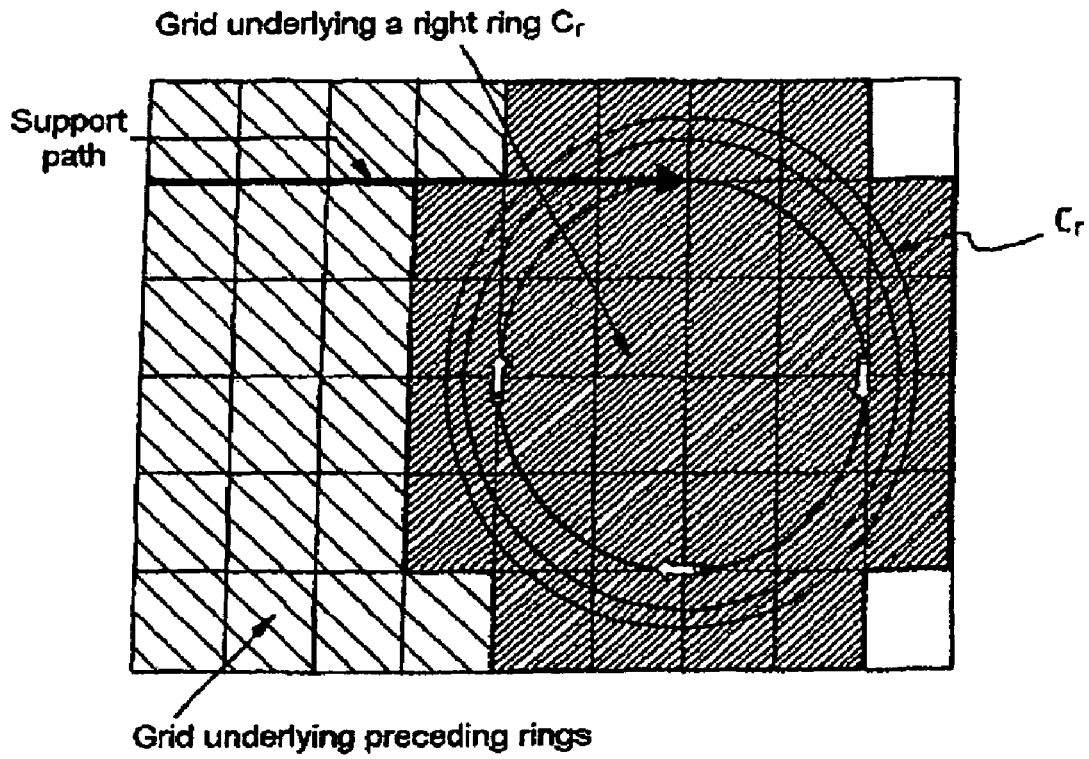

To do this, the areas to be sensed are parameterized so that the digitized relief grids corresponding to these areas, and all the grids in which at least one peak belongs to an area to be sensed, can be extracted from the terrain database. FIG. 3 represents, in the horizontal plane, the grids corresponding to a right ring Cr and the grids of preceding rings.

For each grid tested, the potential danger is determined by comparing $Z_{critical}$ to $Z_{relief}+VSM$,
$Z_{relief}$ being the altitude of the grid concerned,
VSM being a vertical safety margin varying, for example, with the distance between the airplane and the nearest airport, this safety margin typically being 100 m,
and $Z_{critical}$ being a hypothetical altitude defined as being the altitude that the airplane would have when flying over the grid in the case where:
if it is ascending, the ascent would be stopped immediately,
if it is descending, the descent would be continued unchanged,
if it is flying level, the level would be continued unchanged.

Thus, the lateral grids presenting a danger, in other words grids for which $Z_{critical}<Z_{relief}+VSM$, are identified. These dangerous grids can be highlighted, in particular displayed on a screen for the attention of the pilot.

For each of the dangerous grids, a third step is used to calculate the time $\Delta T$ remaining before the start of the avoidance maneuver, in other words the maximum reaction time $T_{reac}$ that the pilot has before performing a pull-out in the vertical plane.

Figure 4A:
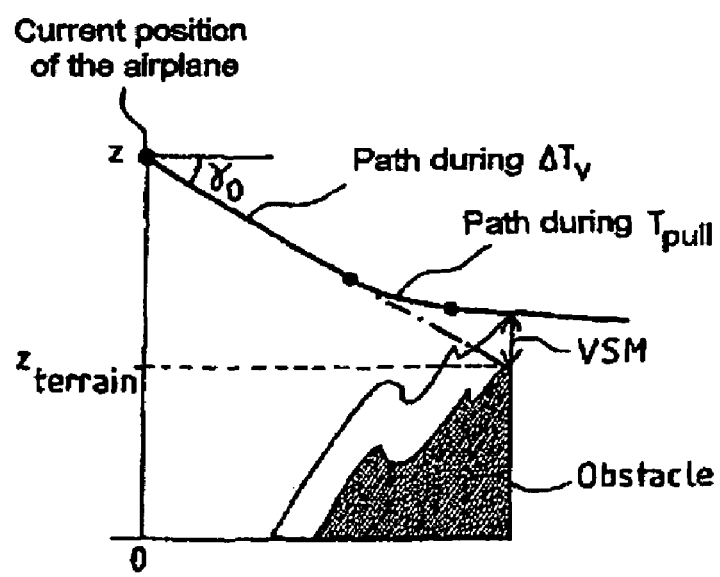
Figure 4B:
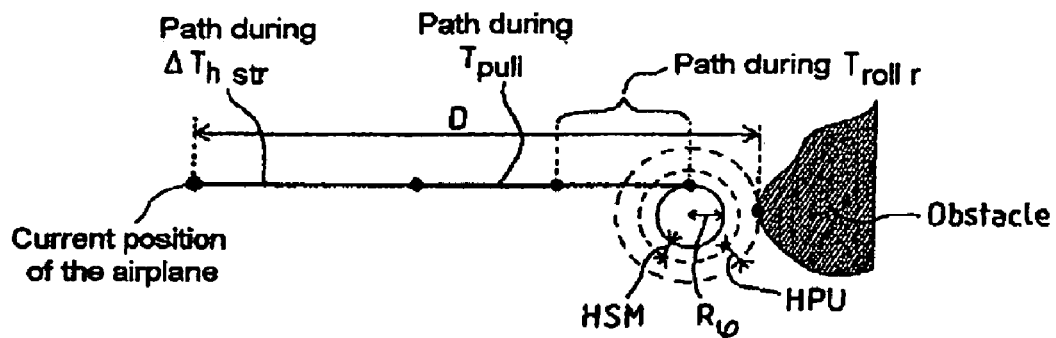

This remaining time $\Delta T$ is calculated by reconstructing a hypothetical flight time toward the point considered dangerous, in other words the obstacle of the dangerous grid. This flight time is calculated in the vertical plane as illustrated in FIG. 4a; it is also calculated in the horizontal plane as illustrated in FIG. 4b, distinguishing the case of a straight-line flight from that of a turning flight.

The time $\Delta T$ is equal to the maximum of the corresponding times in the horizontal plane and in the vertical plane for the case where the airplane is descending, and to the horizontal flight time only for the case where the airplane is ascending or flying level.

| $\Delta T =$ | $\Delta T_{h\ str}$ | ascending, straight |
|---|---|---|
| | $\Delta T_{h\ turn}$ | ascending, turning |
| | $\max(\Delta T_{h\ str}, \Delta T_v)$ | descending, straight |
| | $\max(\Delta T_{h\ turn}, \Delta T_v)$ | descending, turning, |

$\Delta T_{h\ str}$ defining the time remaining in the horizontal plane when the current path of the airplane is straight, $\Delta T_{h\ turn}$ defining the time remaining in the horizontal plane when the current path of the airplane is turning, $\Delta T_v$ defining the time remaining in the vertical plane regardless of the current path of the airplane. It is more specifically the time remaining for the pilot before performing a pull-out to obtain a horizontal path in order, without any lateral avoidance maneuver, to avoid the obstacle identified in the grid considered dangerous, taking into account a vertical safety margin VSM: in practice, normally $\max(\Delta T_h, \Delta T_v)=\Delta T_h$ applies, unless, as is represented in FIG. 4a, $\Delta T_v$ enables the pilot to fly over the obstacle.

We have:

$$\Delta T_{hstr} = \frac{D - R_{\varphi f} - HSM - HPU}{V} - T_{pull} - T_{roll}$$

$$\Delta T_{hturn} = \frac{2R_{\varphi i} * \arcsin\left(\frac{D - R_{\varphi f} - HSM - HPU}{2R_{\varphi i}}\right)}{V} - T_{pull} - T_{roll}$$

with, as indicated in FIG. 4b in the case of a straight line path, D being the distance between the current position of the airplane and the obstacle, $R_{\varphi f}$ being the radius of the avoidance circle, $R_{\varphi i}$ being the radius of the current turn, HSM being a horizontal safety margin and HPU being uncertainty concerning the current position and V being the current speed of the airplane; $\Delta T_{h\ turn}=T_{reac}$ is assumed if arcsin is undefined.

$$\text{And } \Delta T_v = \frac{z - (z_{terrain} + VSM) - \frac{V^2}{fcv}(1 - \cos\gamma_0)}{-V\sin\gamma_0}$$

with, as indicated in FIG. 4a, z being the current altitude of the airplane, $z_{terrain}$ being the altitude of the obstacle, VSM being a vertical safety margin, V being the current speed of the airplane, fcv being the vertical loading factor of the airplane and $\gamma_0$ being its gradient.

For each of the left and right sides, the minimum of these $\Delta T$ values is then identified over all of the dangerous grids, and it is designated $\Delta T_{right}$ and $\Delta T_{left}$.

Figure 4C:
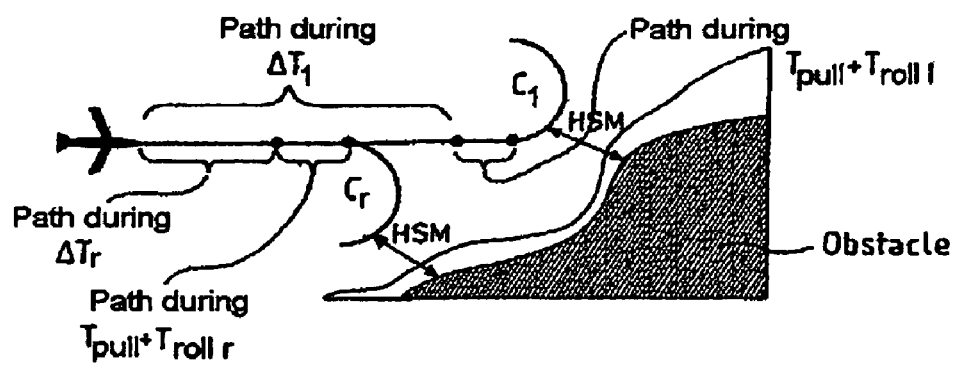

These $\Delta T_{right}$ and $\Delta T_{left}$ values correspond to the nearest dangerous right and left grids, as illustrated in FIG. 4c; here, too, these grids can be highlighted, for the attention of the pilot.

It may be that one of these $\Delta T_{right}$ or $\Delta T_{left}$ values does not exist when, for example, no dangerous grid has been identified on one side.

As illustrated in the horizontal plane in FIG. 4c, the time remaining for the most critical side, in other words the least safe side (the right side in the figure), called the worst lateral (WL), is the one corresponding to the minimum between $\Delta T_{right}$ and $\Delta T_{left}$ and the time remaining for the safest side (left side in the figure), called the best lateral (BL), is that corresponding to the maximum reaction time $T_{reac}$ which is equal to the maximum between $\Delta T_{right}$ and $\Delta T_{left}$.

The fourth step corresponding to an alert management step then begins.

When BL and WL exist, they are compared to predefined times, such as, for example, a time $T_{caution}$ and a time $T_{warning}$. As an example, $T_{caution}$=20 sec and $T_{warning}$=8 sec.

Four classes can then be distinguished for each side:
"Infinite" when BL (or WL) is greater than $T_{caution}$,
"Danger" when BL (or WL) is less than or equal to $T_{caution}$ and greater than $T_{warning}$,
"Critical" when BL (or WL) is less than or equal to $T_{warning}$ and greater than 0 seconds,
"Fatal" or "impossible" when BL (or WL) is less than or equal to 0 seconds.

The same classes can also be defined for a vertical time remaining $T_v$; the aforementioned patents should be referred to for information on how to compute $T_v$.

Figure 5:
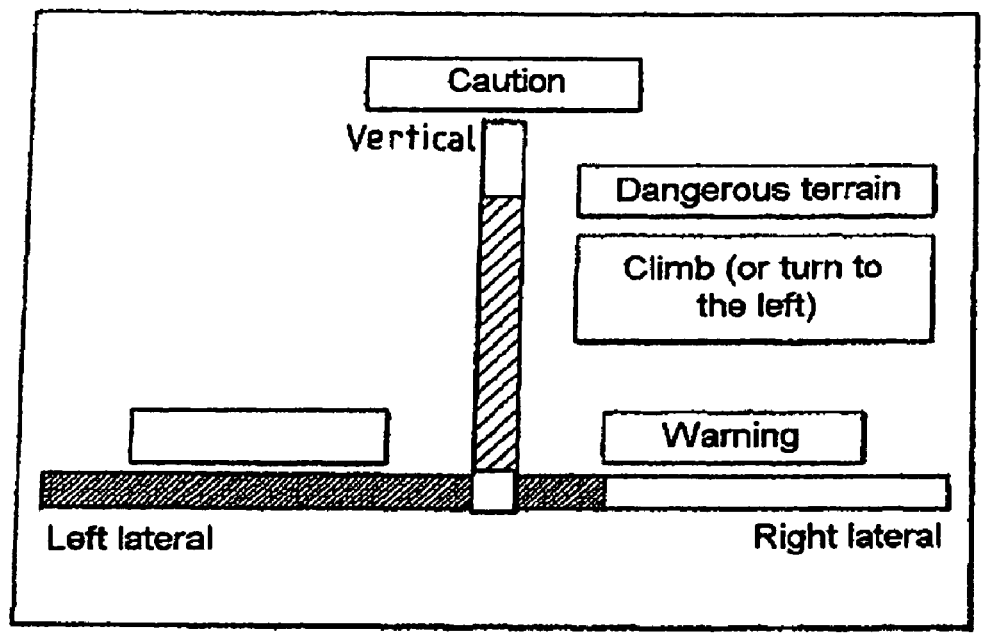

By combining these four classes for each of the Tv, BL and WL, subclasses are obtained, to which are linked notices and/or advice and/or orders, as indicated in the table below, in which the sub-classes are identified by numbers ranging from 1 to 40.

and $\Delta T_{left}$. An example of how this information could be presented is illustrated in FIG. 5.

There now follows a description of the lateral avoidance maneuver proper, occurring at the end of a time less than or equal to $T_{reac}$ maximum+$T_{pull}$+$T_{roll}$.

It concerns a circular maneuver accomplished in the horizontal plane tangential to the preceding path section, in the direction corresponding to that recommended after the preceding step and for which the radius R conventionally takes the form:

$$R = V_{turn}^2 / (g \cdot \tan g\ \phi)$$

$V_{turn}$ being the turning speed, g being the gravitational acceleration (g=9.81 m/s$^2$), $\phi$ being the roll angle.

The speed $V_{turn}$ at which the turn is made is equal to the speed of the airplane in its current position, uprated by 10%, for example, while being limited to a maximum $V_{max}$ dependent on regulations and on the configuration of the airplane. For example, for an A340 type airplane, $V_{max}$

|  | Vertical | Best lateral ("BL") | Worst lateral ("WL") | Notice | Advice | Command |
|---|---|---|---|---|---|---|
| 1 | Infinite | Infinite | Infinite |  | Continue on path |  |
| 2 | Infinite | Infinite | Danger | Caution WL | Continue on path (avoid turn WL) |  |
| 3 | Infinite | Infinite | Critical | Warning WL | Continue on path (avoid turn WL) |  |
| 4 | Infinite | Infinite | Impossible | Avoid WL | Continue on path (avoid turn WL) |  |
| 5 | Infinite | Danger | Danger | Caution Lateral | Continue on path (avoid turn lateral) |  |
| 6 | Infinite | Danger | Critical | Warning WL/Caution BL | Continue on path (avoid turn lateral) |  |
| 7 | Infinite | Danger | Impossible | Avoid WL/Caution BL | Continue on path (avoid turn lateral) |  |
| 8 | Infinite | Critical | Critical | Warning Lateral | Continue on path (avoid turn lateral) |  |
| 9 | Infinite | Critical | Impossible | Avoid WL/Warning BL | Continue on path (avoid turn lateral) |  |
| 10 | Infinite | Impossible | Impossible | Avoid Lateral | Continue on path (avoid turn lateral) |  |
| 11 | Danger | Infinite | Infinite | Caution Vertical | Climb (or turn BL) | Dangerous terrain |
| 12 | Danger | Infinite | Danger | Caution Vertical and WL | Climb (or turn BL) | Dangerous terrain |
| 13 | Danger | Infinite | Critical | Warning WL/Caution Vertical | Climb (or turn BL) | Dangerous terrain |
| 14 | Danger | Infinite | Impossible | Avoid WL/Caution Vertical | Climb (or turn BL) | Dangerous terrain |
| 15 | Danger | Danger | Danger | Caution Vertical and Lateral | Climb (or turn quickly BL) | Dangerous terrain |
| 16 | Danger | Danger | Critical | Warning WL/Caution Vertical and BL | Climb (or turn quickly BL) | Dangerous terrain |
| 17 | Danger | Danger | Impossible | Avoid WL/Caution Vertical and BL | Climb (or turn quickly BL) | Dangerous terrain |
| 18 | Danger | Critical | Critical | Warning Lateral/Caution Vertical | Climb (or turn immediately BL) | Dangerous terrain |
| 19 | Danger | Critical | Impossible | Avoid WL/Warning BL/Caution Vertical | Climb (or turn immediately BL) | Dangerous terrain |
| 20 | Danger | Impossible | Impossible | Avoid Lateral/Caution Vertical | Climb (avoid turn lateral) | Dangerous terrain |
| 21 | Critical | Infinite | Infinite | Warning Vertical | Climb immediately (or turn BL) | Ascend |
| 22 | Critical | Infinite | Danger | Warning Vertical/Caution WL | Climb immediately (or turn BL) | Ascend |
| 23 | Critical | Infinite | Critical | Warning Vertical and WL | Climb immediately (or turn BL) | Ascend |
| 24 | Critical | Infinite | Impossible | Avoid WL/Warning Vertical | Climb immediately (or turn BL) | Ascend |
| 25 | Critical | Danger | Danger | Warning Vertical/Caution Lateral | Climb immediately (or turn rapidly BL) | Ascend |
| 26 | Critical | Danger | Critical | Warning Vertical and WL/Caution BL | Climb immediately (or turn rapidly BL) | Ascend |
| 27 | Critical | Danger | Impossible | Avoid WL/Warning Vertical | Climb immediately (or turn rapidly BL) | Ascend |
| 28 | Critical | Critical | Critical | Warning Vertical and Lateral | Climb immediately (or turn immediately BL) | Ascend |
| 29 | Critical | Critical | Impossible | Avoid WL/Warning Vertical and BL | Climb immediately (or turn immediately BL) | Ascend |
| 30 | Critical | Impossible | Impossible | Avoid lateral/Warning Vertical | Climb immediately (avoid turn lateral) | Ascend |
| 31 | Impossible | Infinite | Infinite | Avoid Vertical | Turn BL | Turn BL |
| 32 | Impossible | Infinite | Danger | Avoid Vertical/Caution WL | Turn BL | Turn BL |
| 33 | Impossible | Infinite | Critical | Avoid Vertical/Warning WL | Turn BL | Turn BL |
| 34 | Impossible | Infinite | Impossible | Avoid Vertical and WL | Turn BL | Turn BL |
| 35 | Impossible | Danger | Danger | Avoid Vertical/Caution Lateral | Turn rapidly BL | Turn BL now |
| 36 | Impossible | Danger | Critical | Avoid Vertical/Warning WL/Caution BL | Turn rapidly BL | Turn BL now |
| 37 | Impossible | Danger | Impossible | Avoid Vertical and WL/Caution BL | Turn rapidly BL | Turn BL now |
| 38 | Impossible | Critical | Critical | Avoid Vertical/Caution Lateral | Turn immediately BL | Turn BL immediately |
| 39 | Impossible | Critical | Impossible | Avoid Vertical and WL/Warning BL | Turn immediately BL | Turn BL immediately |
| 40 | Impossible | Impossible | Impossible | Collision with terrain | Collision with terrain | Collision with terrain |

Information obtained from this table can be displayed, for example, in the form of colored areas, the fill pattern of which is proportional to the respective values of Tv, $\Delta T_{right}$ varies according to its configuration (landing gear down and/or flaps deployed) between 180 knots and 205 knots (1 knot≅1852 m/h).

The method according to the invention is implemented in a navigation aid device preferably on board the airplane; the device may, if necessary, be part of an aircraft radio control system.

Figure 6:
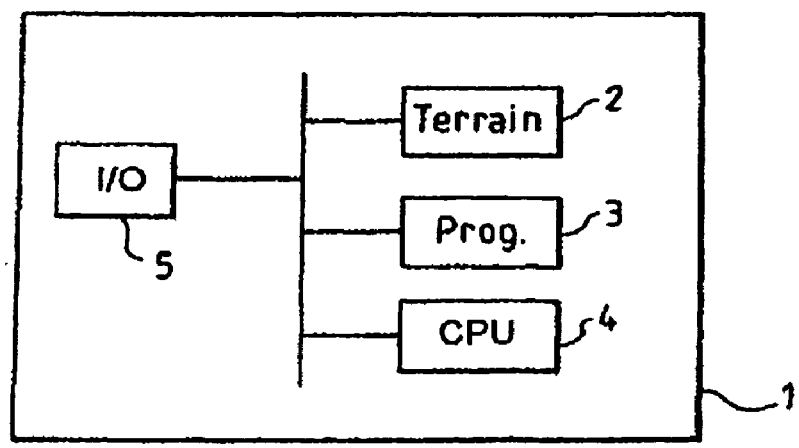

As is represented in FIG. 6, the navigation aid device 1 conventionally comprises at least a mass memory 2 designed to store a terrain database, a program memory 3 comprising an application program of the method described, a central processing unit 4 designed to run the program and an input-output interface 5.

The computations are overall performed, for example, at 100-millisecond intervals.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An aircraft navigation aid method, comprising the steps of:
 a) defining an area to be sensed to the right and to the left of a first hypothetical path of the aircraft, designated the feeler line support path,
 b) sensing, for each of the two areas to be sensed to the right and to the left, a corresponding predefined underlying relief, in order to identify dangerous sub-zones to the right and/or to the left,
 c) computing, for each of the dangerous sub-zones to the right and/or to the left, a time $\Delta T$ remaining to begin an avoidance maneuver before a point of no return, and determining for the dangerous sub-zones to the right a minimum $\Delta T$ denoted $\Delta T$ right and/or for the dangerous sub-zones to the left a minimum $\Delta T$ denoted $\Delta T$ left,
 d) establishing a navigation aid from $\Delta T$ right and/or $\Delta T$ left.

2. The method as claimed in claim 1, wherein the feeler line support path is determined during a time T broken down into a pilot reaction time $T_{reac}$, a time $T_{pull}$ for placing the aircraft on a horizontal path and a time $T_{roll}$ for placing the aircraft in a roll.

3. The method as claimed in claim 1, wherein an area to be sensed to the right and/or to the left is defined according to rings succeeding one another, each ring presenting a diameter D in the form D=d+safety margin, d being the diameter of a circular avoidance maneuver.

4. The method as claimed in claim 1, wherein the areas to be sensed are defined according to the current straight-line or turning path of the aircraft.

5. The method as claimed in claim 1, wherein it comprising a step prior to step b) of parameterizing the areas so that the relief underlying these areas can be sensed.

6. The method as claimed in claim 5, wherein the areas and the relief are parameterized according to a grid reference.

7. The method as claimed in claim 1, wherein the dangerous sub-zones of step b) are identified according to a second hypothetical path of the aircraft such that:
 if the aircraft is ascending, the ascent is stopped immediately,
 in other cases, the path is continued unchanged.

8. The method as claimed in claim 1, wherein the time $\Delta T$ of step c) is computed according to a hypothetical flight time toward a dangerous sub-zone, calculated according to a time $T_{pull}$ to place the aircraft in a horizontal path and a time $T_{roll}$ to place the aircraft in a roll:
 in a horizontal plane when the aircraft is ascending or flying level,
 in a horizontal plane and in a vertical plane when the aircraft is descending.

9. The method as claimed in claim 1, wherein step d) comprises a step for comparing $\Delta T$ right and/or $\Delta T$ left with one or more predefined times.

10. The method as claimed in claim 1, wherein step d) comprises a step of determining the time remaining for the safest side (best lateral) (safer) from the maximum between $\Delta T$ right and/or $\Delta T$ left and the time remaining for the least safe side (worst lateral) (less) from the minimum between $\Delta T$ right and/or $\Delta T$ left.

11. The method as claimed in claim 1, wherein it comprises a step consisting in generating a lateral avoidance maneuver.

12. An aircraft navigation aid device, comprising a mass memory designed to store a terrain database, a program memory comprising an application program of the method as claimed in claim 1, a central processing unit designed to run the program and an input-output interface.

13. The method as claimed in claim 2, wherein an area to be sensed to the right and/or to the left is defined according to rings succeeding one another, each ring presenting a diameter D in the form D=d+safety margin, d being the diameter of a circular avoidance maneuver.

14. The method as claimed in claim 2, wherein the areas to be sensed are defined according to the current straight-line or turning path of the aircraft.

15. The method as claimed in claim 3, wherein the areas to be sensed are defined according to the current straight-line or turning path of the aircraft.

16. The method as claimed in claim 3, wherein it comprising a step prior to step b) of parameterizing the areas so that the relief underlying these areas can be sensed.

17. The method as claimed in claim 2, wherein the dangerous sub-zones of step b) are identified according to a second hypothetical path of the aircraft such that:
 if the aircraft is ascending, the ascent is stopped immediately,
 in other cases, the path is continued unchanged.

18. The method as claimed in claim 2, wherein the time $\Delta T$ of step c) is computed according to a hypothetical flight time toward a dangerous sub-zone, calculated according to a time $T_{pull}$ to place the aircraft in a horizontal path and a time $T_{roll}$ to place the aircraft in a roll:
 in a horizontal plane when the aircraft is ascending or flying level,
 in a horizontal plane and in a vertical plane when the aircraft is descending.

19. The method as claimed in claim 3, wherein the time $\Delta T$ of step c) is computed according to a hypothetical flight time toward a dangerous sub-zone, calculated according to a time $T_{pull}$ to place the aircraft in a horizontal path and a time $T_{roll}$ to place the aircraft in a roll:
 in a horizontal plane when the aircraft is ascending or flying level,
 in a horizontal plane and in a vertical plane when the aircraft is descending.

20. The method as claimed in claim 7, wherein the time $\Delta T$ of step c) is computed according to a hypothetical flight time toward a dangerous sub-zone, calculated according to a time $T_{pull}$ to place the aircraft in a horizontal path and a time $T_{roll}$ to place the aircraft in a roll:
 in a horizontal plane when the aircraft is ascending or flying level,
 in a horizontal plane and in a vertical plane when the aircraft is descending.

* * * * *